United States Patent Office 3,704,256
Patented Nov. 28, 1972

3,704,256
FLAME-RESISTANT POLYURETHANES
Robert L. Shone, Palatine, Ill., and Thomas W. Findley, Westbury, N.Y., assignors to Swift & Company, Chicago, Ill.
No Drawing. Filed Dec. 4, 1969, Ser. No. 882,338
Int. Cl. C09f 11/10
U.S. Cl. 260—404.5    4 Claims

ABSTRACT OF THE DISCLOSURE

Halogen-containing polyisocyanates, obtained by reacting a halogen-containing higher fatty acid ester and a polyisocyanate, are produced and used to prepare flame-resistant, non-rigid, cellular materials such as polyurethane foams having minimum shrinkage on curing.

This invention pertains generally to the preparation of novel, halogen-containing polyisocyanates, their use in non-rigid polyurethane foams and more particularly to the preparation of stable polyisocyanated polyurethanes capable of forming flame-resistant foams and non-cellular materials such as plastisol type compositions.

It has previously been proposed to prepare polyurethane foams by reacting a polyhydroxy compound such as a polyester, a polyoxyalkylene glycol or similar polyols with an organic polyisocyanate in a reaction mass containing a foaming agent. Polyurethane foams produced in this conventional manner have some degree of flame resistance, but it has been necessary in the past to produce a foam that possesses a much higher degree of flame resistance for use in a number of systems.

Foams made flame-resistant merely by the physical addition of additives often deteriorate on aging because the additives act as plasticizers. Deterioration of this type also adversely affects the physical properties of the foam. For example, a halogen-containing material incorporated in a urethane foam may reduce flammability tendencies but at the same time act as a migrating plasticizer during the curing or foaming operation and affect a loss of tensile strength, compression set or load-bearing properties, etc.

Incorporation of flame-retardant materials into urethane foams by chemically bonding the additives into the polymer network offers advantages over foams containing inert, additional flame retardants. In this connection one type of reactive flame retardant in a urethane reaction system is described chemically as a compound containing one or more labile hydrogen atoms available as reactive sites. The labile hydrogen can be part of any group such as amino, hydroxyl, carboxyl, etc., but it should be reactive enough to react with the cyano group of the isocyanate. Another type of reactive flame retardant in a urethane reaction is described chemically as a compound containing one or more reactive isocyanate groups that is reactive enough to react with the labile hydrogen of an amino, hydroxyl, carboxyl, etc. In this case the flame retardant elements are incorporated into the isocyanate system either directly or by forming a quasi-prepolymer before the final urethane reaction. The reactive type of flame-retardant additive can combine chemically with the foam and will not evaporate from the surface or leach out when the foam is completely cured.

It has been proposed in U.S. Pat. No. 3,206,416 to use halogenated castor oil, namely brominated or chlorinated castor oil, as a reactive flame retardant in polyurethane foams. These materials are prepared by carrying out the halogenation of castor oil at about 50° to 150° C. but preferably from 80° C. to 130° C. The halogenated oils obtained in this manner have less than about 30% halogen, a viscosity of 800–2000 cp./25° C., hydroxyl numbers from 97 to 129, and acid numbers from 33 to 41. These halogenated castor oils produce flame-resistant polyurethane foams but possess the disadvantage of themselves being chemically unstable at ambient temperatures in the range of 15° C. to 40° C. Use of these halogenated oils in polyurethane foam preparations is then limited since the physical properties of the compound that are important for imparting desired properties to the polyurethane foam (viscosity, hydroxyl number, acid number and color) change substantially on aging at ambient temperatures. For example, brominated castor oil prepared in the aforementioned fashion undergoes a decrease of hydroxyl number and a parallel increase in acid number during aging at 55° C. in the following manner:

| Time | Hydroxyl value | Acid number |
|---|---|---|
| Initial | 124 | 16 |
| 2 days | 115 | 23 |
| 4 days | 106 | 26 |
| 8 days | 96 | 33 |
| 5 months | 48 | 49 |

The above product was made using the most mild conditions taught in the patent; yet it is quite apparent that the halogenated oil is extremely unstable and is not capable of being an acceptable commercial product. Aging at ambient temperatures is slower but proceeds in the same manner.

Further, halogenated castor oils aged at ambient temperatures have shelf lives of less than six months. The use of halogenated castor oils, prepared as described above, as reactive flame-retardant polyols in polyurethane foams suffers from the disadvantage of having physical properties, especially acid numbers that are too high initially, that are constantly changing on aging. A mixture that is formulated using these halogenated oils as a polyol constituent may not be foamable since the large concentration of acid may effectively neutralize the small amounts of amine catalyst that are often added to catalyze the polyol isocyanate reaction. Hence, the utilization of such halogenated castor oils for the preparation of polyurethane foams requires the use of large amounts of amines or amino polyols as constitutents of the polyol mixture.

Since the hydroxyl number decreases along with a parallel increase in acid number, it is logical to assume that hydrogen bromide is readily formed when castor oil is halogenated by the above procedure. In this connection, most isocyanates are quite reactive and are treated by the manufacture with a slight amount of HCl to modify the rate of reactivity. However, the large amount of HBr formed in the prior art procedure interferes to such an extent with the isocyanate reactant that poor foams are produced and extra-long periods of time are consumed during the reaction.

It is also noted that brominated castor oil is an inherently unstable product even if prepared under very mild conditions, i.e., halogenated at temperatures less than about 30° C. This is borne out by the increase in acid value and decrease in viscosity as shown in the following table. This instability of brominated castor oil renders it nearly useless in a practical sense in urethane technology.

| Time | Sample number | Visc. and temp. | Acid number |
|---|---|---|---|
| Initial | 427A | 45,300.0 at 23° C | 2.9 |
| 1 day | 427B | 1,687.0 at 59° C | 3.5 |
| 2 days | 427C | 1,667.0 at 54° C | 3.7 |
| 3 days | 427D | 1,379.0 at 56° C | 4.6 |
| 6 days | 427E | 1,161.0 at 57° C | 10.6 |
| 7 days | 427F | 982.0 at 60° C | 11.9 |
| 8 days | 427G | 935.0 at 55° C | 13.5 |
| 9 days | 427H | 943.0 at 54° C | 14.9 |
| 10 days | 427I | 826.0 at 57° C | 16.0 |
| 13 days | 427J | 665.0 at 57° C | 19.0 |
| 14 days | 427K | 968.0 at 53° C | 19.8 |
| 15 days | 427L | 810.0 at 53° C | 20.5 |
| 16 days | 427M | 864.0 at 50° C | 21.1 |
| 17 days | 427N | 821.0 at 55° C | 22.9 |
| 20 days | 427O | 826.0 at 54° C | 23.5 |

Accordingly, it is one object of this invention to produce a stable halogen-containing fatty acid ester-polyisocyanate that possesses physical properties that remain essentially unchanged on aging.

It is another object of this invention to provide a method for making flame-resistant polyurethane foam which will remain flame resistant even after prolonged aging periods.

A further object of the invention is to prepare foams from halogenated castor oil using normal amounts of conventional amine catalyst and polyol mixtures that do not contain large amounts of amines or amino polyols.

Additional objects not specifically set forth herein will be readily apparent to those skilled in the art from a reading of the detailed description of the invention which follows.

In general, the novel compositions of this invention are halogen-containing polyesters having multiple isocyanate groups capable of further reaction with labile hydrogen atoms. The compositions are derived from polyisocyanates and halogen-containing hydroxy higher fatty acid esters of low molecular weight polyols. The esters containing hydroxy and halogen are prepared by halogenating, under very restrictive conditions, hydroxy-containing esters. At this point the hydroxy-containing ester will hereinafter be called a polyol ester. Polyol esters containing halogen atoms tend to decompose quite rapidly in the presence of light and/or temperatures above 70° F. In order to avoid such decomposition, reaction with the polyisocyanates is conducted promptly after the formation of the halogen and hydroxy-containing ester.

The compositions of this invention are multi-functional polyisocyanates and are useful as the major building blocks in urethane systems requiring non-burning characteristic. They may be used in semi-rigid urethane applications including foams, coatings, adhesives and potting compounds, and they exhibit excellent electrical properties, as well as good hydrolytic stability. In the absence of oxygen and moisture, the materials have a storage life of well over six months.

In forming the halogen-containing polyisocyanates of this invention, sufficient excess isocyanate is mixed with the halogenated polyol ester so as to produce a final product having between about 3% to 25% by weight, basis final product, of available free isocyanates groups in the composition. In general, the compositions possess a viscosity above 5,000 (cp./25° C.) and may range up to a solid. The isocyanated products have a halogen content of between about 15–20%, preferably about 16–18% bromine.

The polyol ester reactant that is halogenated is a higher fatty hydroxy acid ester of a polyhydric alcohol wherein the alcohol portion contains about 2–6 carbons and about 2–6 hydroxyl groups. The term "higher fatty hydroxy acids" as used herein refers to fatty acids either straight or branch chain of about 8 to 30 carbon atoms (10–22 carbons preferred) and contains one or more hydroxyl groups per ester molecule. Castor oil is an example of a naturally occurring unsaturated polyol ester while the ethylene glycol ester of ricinoleic acid is an example of a synthetic, unsaturated polyol ester. Suitable low molecular weight polyhydric alcohols that make up the polyol ester reactant are selected from the glycols, triols, tetraols, pentols, hexols and are represented by ethylene glycol, glyercol, pentaerythritol, sorbitol, etc. Since these low molecular weight polyhydric alcohols are multi-functional, it is possible that the hydroxyl function be present on only some of the acyl radicals making up the polyol ester.

In halogenating the polyol ester reactant, the unsaturated portion of the ester, usually a triglyceride, can be most effectively halogenated by contacting the unsaturated polyol with free halogen such as chlorine or bromine. When halogenating a glyceride, about 90–98% of the double bonds are reacted. While products halogenated to less than 90% of the available double bonds are stable, if promptly reacted with an isocyanate, they are less desirable inasmuch as one is not taking full advantage of the functional sites available in the product. If the polyol is halogenated above about 98% of the available double bonds, the stability of the product drops off rapidly and the product tends to become unstable.

More specifically, the method of halogenating the hydroxy glycerides used in this invention comprises brominating the unsaturated compound in the presence of a mixture of water and a solvent for the material undergoing bromination. The bromination reaction involves the steps of combining bromine with the unsaturated material being brominated in the presence of the mixture to initiate the exothermic reaction and, also, controlling the temperature of the reaction to insure efficient addition of bromine to the unsaturated compound while avoiding darkening of the product. The reaction temperature is preferably held below about 38° C., usually 25° C. to 30° C., by cooling as required. The reaction is carried out by agitating the mixture of water and the additional liquid carrier, along with the brominatable material and bromine. During the course of the reaction an emulsion forms but upon completion of the reaction the emulsion separates.

It is preferred to use a mixture of water and an auxiliary liquid carrier so as to produce a highly brominated product of satisfactory color and good yield. If water alone is employed in the reaction, difficulties with the formation of tight emulsions arise and the product, which is a pasty mass, requires considerable additional treatment to produce even a poor yield of the brominated product. If the auxiliary carrier is employed as the sole inert carrier, a product having an unsatisfactory color and too high an acid value results. Auxiliary carriers which in combination with water are employed in the bromination reaction are non-polar solvents such as petroleum ether, diethyl ether, hexane, etc. Petroleum ether is a fraction of 5 to 6 carbon aliphatic hydrocarbons having a boiling point in the range of about 40–60° C. Other non-polar, low-boiling solvents boiling below about 65° C. which are inert under the conditions of the reaction may also be employed. The order of addition of the reactants is variable, and it is not critical whether the bromine is added dropwise to a mixture of the material to be brominated in water and the non-polar solvent or whether bromine in the non-polar solvent is added to a water mixture of the material being brominated.

The amount of water used in the carrier can be varied considerably, although there should be enough water present in the carrier to retard the development of color. Usually at least about 25% water based on the weight of the material being brominated produces a measurable color improvement. Larger amounts, around 50–75% water based on the weight of the oil, are preferred. As the amount of water in the reaction exceeds about 100% based on the brominated material, an objectionable, viscous, pasty-type emulsion is produced and it is extremely difficult to isolate the brominated product from water and bromine.

Concerning the inert, non-polar solvent, it is present in at least about 15% based on the weight of the brominatable material so as to insure good contact of the reactants and to provide a workably fluid reaction mixture. It is generally preferred to use around 20-25% of the non-polar solvent based on the brominated material. It is possible to use larger amounts of the non-polar solvent, although no benefit is derived from the use of these larger amounts, and it is generally desirable to hold the volume of inert carriers to a minimum to obtain maximum efficiency of the capacity of the reaction vessel.

The drying of the halogenated polyol and removal of solvent from the polyol can be accomplished by evaporating the materials from the polyol in the form of a thin film. A very thin film of the brominated material is formed and subjected to a high vacuum and a temperature sufficiently high so that the solvent will be flashed off.

More in detail, the specific halogenated polyols useful in this invention have 90 to 98% of the theoretical double bonds halogenated. The reaction products generally have the following characteristics: a viscosity of more than 10,000-12,000 cp./25° C. and preferably more than 20,000 cp.; an iodine value of less than 10 and preferably less than about 4.5; an acid number of less than 10 and usually 5 and preferably less than about 2; a hydroxy value of between 80 and 140 (usually between 100 and 110); and a weight percent of bromine of between about 25% and about 34%. In some cases it is preferred to have 31-34% bromine in the molecule.

When halogenating the polyols used in this invention, a small amount (less than 10% by weight of an epoxidized oil such as epoxidized linseed oil having an oxirane content above about 8.8%) can be added to the brominated mixture so as to aid in stripping off the solvent.

It should be noted that the halogenated castor oils produced by this method have a very low acid value. Typically acid values of less than 3 and with care less than 2 can be produced in this way. This should be contrasted to values of around 40 produced by the prior art methods. In urethane technology, high acid values are very deleterious since the free acid in the system will react with the catalysts used and keep the urethane from foaming properly or even foaming at all. Therefore any acid in the polyol system must be neutralized before reaction. This is usually accomplished by adding a base such as an amine or hydroxy substituted amine to neutralize the acid. If the acid value is very high a considerable amount of base must be added and this will adversely affect the physical properties of the resultant foam. It is therefore important that the polyol have as low an acid value as possible and the method of this invention produces such a low acid brominated castor oil.

It should be further noted that brominated castor oil is an inherently unstable product. When allowed to stand even at room temperature the product decomposes. This is borne out by the increase in acid value and subsequent decrease in hydroxyl value and viscosity. This instability of brominated castor oil renders it nearly useless in a practical sense in urethane technology. One object of this invention is to produce an undecomposed halogenated castor oil and stabilize it against further decomposition by forming a quasi-prepolymer soon after forming the halogenated castor oil by reacting the polyol with a polyisocyanate such that the resulting quasi-prepolymer will have from about 3% to abolt 25% free isocyanate groups left in it. In this way the hydroxyl groups of the halogenated castor oil are tied up in a urethane bond and are no longer free to react with the halogen in the molecule leading to the decomposition of the halogenated castor oil.

When the bromination of castor oil is done without solvent or at a high temperature in the presence of a hydrocarbon solvent only, there is an acceleration of the decomposition of the resulting brominated castor oil as evidenced by high acid values. In addition, not only does reaction at the double bond take place, but some substitution reactions also take place on the carbon chain leading to more decomposition. This can be seen by comparing the viscosity of the decomposing brominated castor oil product of a prior art reference of about 800–2000 cp./25° C. with values of about 15,000–50,000 cp./25° C. for the non-decomposed, very low acid value brominated castor oil prepared by the methods of this invention.

The non-decomposed brominated castor oil of high viscosity and acid values less than about 2 produced by this invention is an ideal material to incorporate into a urethane formulation as sole polyol or mixed with other polyols. However if the product is stored at room temperature for long periods or at elevated temperatures for even short periods, it will also decompose as evidenced by a build-up in acid value, a darkening of color, and a reduction in hydroxyl value and will become as useless a urethane polyol as brominated castor oil made by other procedures. To protect against this decomposition it has been found that if one prepares a quasi-prepolymer with a polyisocyanate very soon after the castor oil is brominated, the resulting quasi-prepolymer is stable, does not decompose, increase in acid value nor darken in color. It has been further found that no great care need be exercised in the handling of the quasi-prepolymer, nor any unreasonable temperature requirement placed on its storage.

The amount of polyisocyanate added is an amount such as to react with all the hydroxyl groups in the brominated castor oil and leave an excess of from about 3% to 25% isocyanate groups. So long as the quasi-prepolymer is kept away from oxygen and moisture, it is stable almost indefinitely. When the foam formulator is ready to use it in a urethane formulation, it is only necessary to blend the quasi-prepolymer with a small amount of additional polyol, a blowing agent, and the catalysts normally used in urethane technology and well known to those skilled in the art, in order to form excellent urethane foams that are nonburning. In this way an inherently unstable product made by an improved procedure that produces it in an undecomposed form for the first time, is permanently stabilized against decomposition by forming the quasi-prepolymer.

As discussed earlier, the important aspect of this invention is the prompt reaction of the polyisocyanate with the halogenated polyol reactant. Whether the polyisocyanate can be immediately reacted with the halogenated polyol ester depends upon the solvent system used to form the halogenated reactant. If water or other protic solvent are used, they must be removed prior to contact with the isocyanates since they are reactive with the NCO functions.

When reacting the halogen-containing polyol with the polyisocyanate, strict anhydrous conditions are maintained and the mixture heated to between about 30° C. and about 125° C., preferably between about 60° C. and 80° C. Heating is discontinued and the reaction temperature is maintained below 125° C. with cooling. Before the reaction there are at least two and usually more than about 2.5 NCO functions for each OH group. Suitable polyisocyanates include 2,4-toluene diisocyanate; 2,6-toluene diisocyanate; and isomer mixtures thereof such as 80/20 or 65/35 of the two mentioned isomers, xylene-1,3 - diisocyanate; xylene-1,4-diisocyanate; naphthalene-1,4-diisocyanate; naphthalene-1,5-diisocyanate; dodecamethylene diisocyanate; undecamethylene diisocyanate; hexamethylene diisocyanate; pentamethylene diisocyanate; ethylene diisocyanate; propylene diisocyanate; 4,4'-diphenyl methane diisocyanate; 4,2'-diphenyl methane diisocyanate; furfurylidene diisocyanate; p-phenylene diisocyanate; m-phenylene diisocyanate; o-phenylene diisocyanate; cyclohexylene-1, 4-diisocyanate; and polymethylene polyphenyl isocyanate or the like.

If the acid value of a halogenated glyceride has risen substantially because of decomposition during storage, the halogenated polyol ester tends to react very slowly with the isocyanate. Hence, it is preferred to react the halogen-containing polyol with the isocyanate before the acid value rises appreciably, i.e., before an acid value of 10, preferably about 3, is reached.

As discussed earlier, an outstanding use of the novel halogenated isocyanates of this invention is in providing flame resistance for polyurethane foams. The term "flame-resistant" is used to characterize the material which does not burn readily. The halogenated isocyanates may be used individually or in various mixtures and combinations with other isocyanates.

The production of polyurethane foams is well known, and a detailed description of such processes is not warranted here. Briefly, however, the process involves the reaction of an isocyanate and another poly-functional compound which contains an active hydrogen, i.e., hydroxyl, carboxyl, amino groups, etc.

In its broadest aspects, the invention contemplates the preparation of polyurethane foams using the halogen-containing isocyanates of this invention as the sole isocyanate component of the polyurethane foam. However, the mixtures of other isocyanates may be used along with the halogenated isocyanates of this invention.

The invention also contemplates the preparation of urethane plastisols, potting compounds, coatings, and laminates using the halogen-containing isocyanates of this invention either as the sole isocyanate component or mixed with other isocyanates in order to render said plastisols, potting compounds, coatings and laminates flame resistant.

The following examples illustrate specific embodiments of the invention, but the examples are to be considered in an illustrative and not in a limitative sense.

EXAMPLE I

Castor oil in an amount of 1,760 grams was mixed with 490 grams of petroleum ether (boiling point approximately 50° C.) and 700 grams of water. Bromine in an amount of about 883 grams was slowly added to the castor oil, water and petroleum ether and the reaction mixture while maintaining a temperature below 30° C. with cooling and mild agitation. After the addition of bromine was complete the agitation and cooling was discontinued. Sufficient time was allowed for the separation of the brominated castor oil-petroleum ether phase from the aqueous phase. The brominated castor oil-petroleum ether phase was decanted and stripped of solvent in a suitable solvent evaporator. The residue after evaporation was a light, honey-colored, clear viscous oil. It had a viscosity of approximately 50,000 centipoises at 25° C. The acid number was 1.2 and had a hydroxyl number of 105 and a bromine content of about 30.5% by weight. Following this, 1,000 grams of the brominated castor oil was charged into a reactor containing 778 grams of toluene diisocyanate. The mixture was stirred mildly with slight warming. In a short time the reaction exotherm brought the temperature up to approximately 180° F. and it gradually decreased. The resulting product was a light clear amber liquid having 17% available isocyanate by weight with a viscosity of approximately 6000 cp. at 25° C.

EXAMPLE II

A mixture of about 19.3 parts triisopropanolamide, 1 part castor oil, 1 part of a water soluble silicon co-polymer, .1 part triethylene diamine, and 13.3 parts trichlorofluormethane was prepared. The resulting mixture was stirred into 65.5 parts of a bromine containing polymethylene polyphenylisocyanate quasi-prepolymer formed by the procedure outlined in Example I. The flame-resistant polyurethane foam formed from the liquid reaction mixture had a density of about 2.1 lbs. per ft.$^3$, a compression strength of about 25 lbs. per in.$^2$ and was classified as self-extinguishing according to ASTM D 1692–59T.

EXAMPLE III

Into a glass-lined vessel was charged 526 grams of brominated castor oil (31% bromine by weight) and 420 grams of toluene diisocyanate. Prior to introduction of the reactants, the vessel was purged with nitrogen and care was taken during the reaction to maintain an anhydrous, relatively oxygen free atmosphere. Mild agitation continued throughout the reaction. The temperature of the reaction mixture rose slowly and maximized somewhere around 100° C. The mixture was agitated for one hour after this temperature had been reached. The product was analyzed and contained approximately 17±.2% by weight, available isocyanate functions. The product had a viscosity of about 6,200 cp. at 25° C. and functioned as an excellent potting reactant.

A similar product with a viscosity of about 51,000 cp. @ 25° C. was made using the same reactants with a slightly different weight ratio. In this example 526 grams of brominated castor oil (31% bromine by weight) were charged with 313 grams of toluene diisocyanate to give a product with 13±.2% NCO.

EXAMPLE IV

Into a vessel was charged 526 grams of brominated castor oil (30.5 bromine by weight) and 239 grams of hexamethylene diisocyanate. The reaction vessel was purged with nitrogen and the system agitated for about one hour. The temperature reached a maximum of about 120° C. The quasi-prepolymer possess 10±.2% NCO functions by weight and was dispensed into suitable containers.

EXAMPLE V 242 grams of diphenyl methane diisocyanate and 526 grams of brominated castor oil (31.1% bromine by weight) were charged into a vessel and the reaction heated to a temperature of about 110° C. for 1½ hours. After an additional agitation for one hour the product was dispensed into a suitable container and the quasi-prepolymer possessed an NCO content of 4.0±.2%.

Obviously many modifications and variations of the invention as hereinbefore set forth may be made without departing from the spirit and scope thereof, and, therefore, only such limitations should be imposed as are indicated in the appended claims.

We claim:
1. A method for preparing a halogenated polyisocyanate quasi-prepolymer which comprises first halogenating about 90–98% of the theoretical double bonds of an hydroxy-containing unsaturated triglyceride with bromine or chlorine at a temperature of less than about 38° C. in an aqueous solvent system so that the halogenated hydroxy-containing triglyceride has an acid value of less than 5 and a viscosity greater than about 10,000 cp./25° C., promptly separating said halogenated hydroxy-containing triglyceride from said aqueous solvent system and promptly thereafter reacting said halogenated hydroxy-containing triglyceride with a polyisocyanate selected from the group consisting of 2,4-toluene diisocyanate; 2,6-toluene diisocyanate; and isomer mixtures thereof such as 80/20 or 65/35 of the two mentioned isomers; xylene-1,3 diisocyanate; xylene-1,4-diisocyanate; naphthalene-1,4-diisocyanate; naphthalene-1,5-diisocyanate; dodecamethylene diisocyanate; undecamethylene diisocyanate; hexamethylene diisocyanate; pentamethylene diisocyanate; ethylene diisocyanate; propylene diisocyanate; 4,4'-diphenyl methane diisocyanate; 4,2'-diphenyl methane diisocyanate; p-phenylene diisocyanate; m-phenylene diisocyanate; o-phenylene diisocyanate; cyclohexylene-1,4 diisocyanate; and polymethylene polyphenyl isocyanate in such proportions that the resulting quasi-prepolymer has between about 3% and about 25% free isocyanate groups.

2. The method of claim 1 wherein the hydroxy containing unsaturated triglyceride is castor oil.

3. The method of claim 1 wherein the halogenated hydroxy-containing triglyceride is bromined castor oil having an iodine value of less than 10, an acid number less than about 3, a hydroxyl number between about 80 and 100 and containing between about 25% and about 34%, by weight, of bromine.

4. The method of claim 1 wherein the aqueous solvent system comprises water and petroleum ether.

References Cited

UNITED STATES PATENTS

| | | | |
|---|---|---|---|
| 3,206,416 | 9/1965 | Dahm | 260—404.5 |
| 3,483,150 | 12/1969 | Ehrlich et al. | 260—404.5 |
| 3,345,311 | 10/1967 | Ehrlich et al. | 260—404.5 |
| 3,028,403 | 4/1962 | Fritz et al. | 260—408 |
| 3,240,794 | 3/1966 | Bornfleth | 260—408 |
| 1,862,596 | 6/1932 | Keller et al. | 260—408 |
| 3,318,828 | 5/1967 | Seiner | 260—404.5 |
| 3,183,112 | 5/1965 | Gemassmer | 260—404.5 |

FOREIGN PATENTS

| | | | |
|---|---|---|---|
| 8,940 | 4/1968 | Japan | 260—408 |

LEWIS GOTTS, Primary Examiner

G. HOLLRAH, Assistant Examiner

U.S. Cl. X.R.

260—2.5 AT, 2.5 FP, 18 TN, 347.4